Aug. 29, 1961 S. UNTERMYER 2ND 2,998,367
BOILING REACTORS
Filed Feb. 16, 1956 2 Sheets-Sheet 1
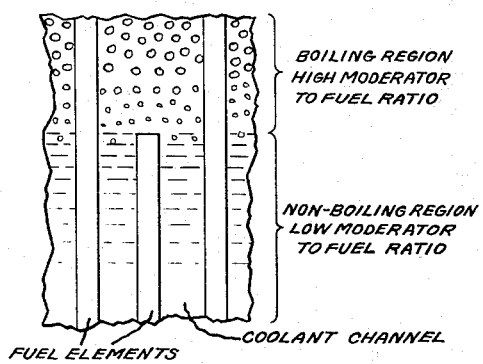
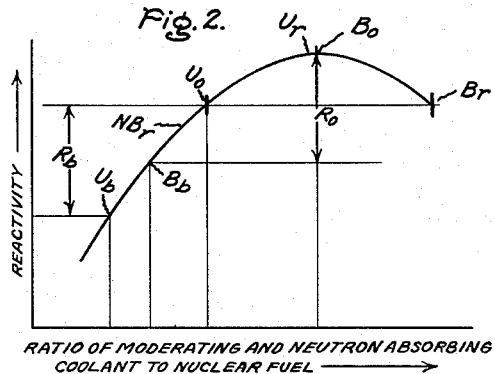
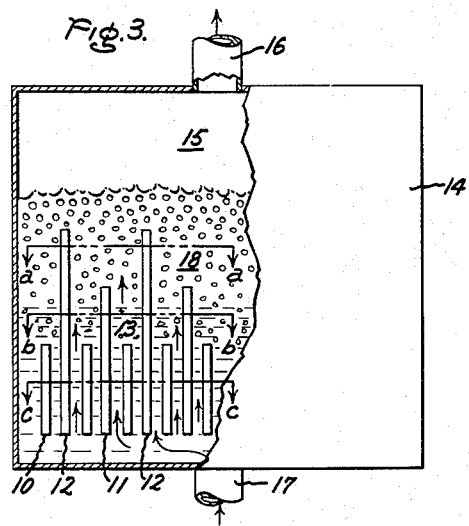
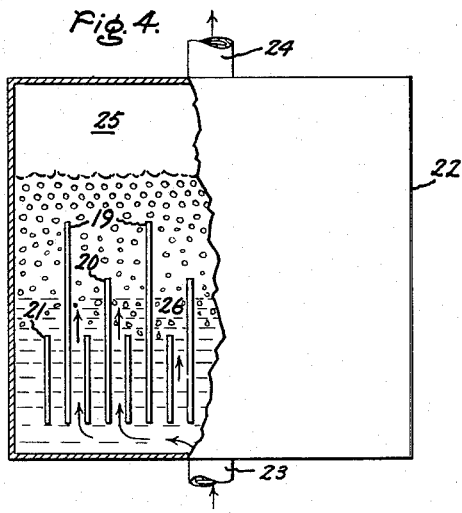
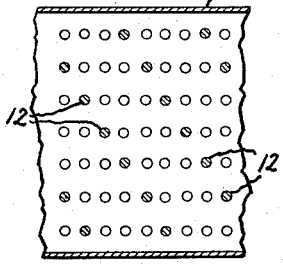
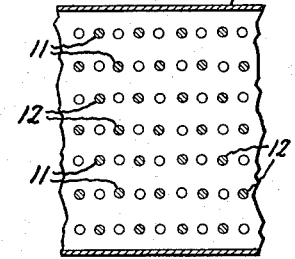
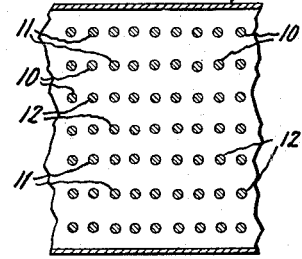
*Inventor:*
*Samuel Untermyer 2nd,*
*by Leonard B. Mackey*
*His Attorney.*

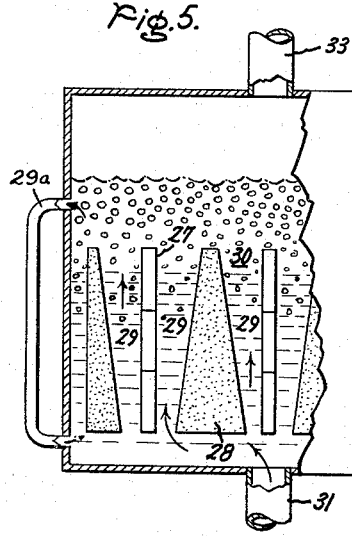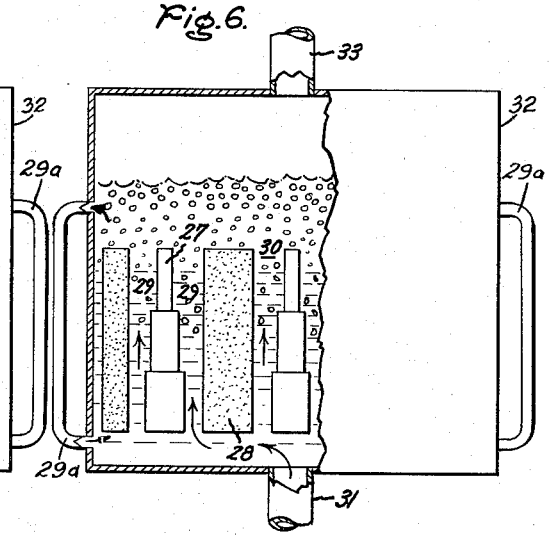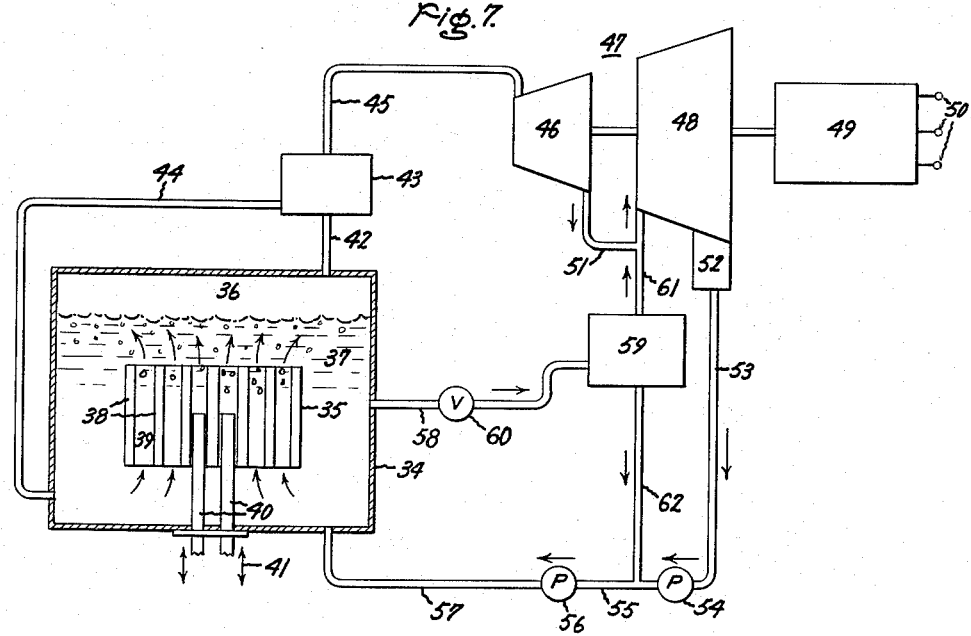

United States Patent Office 2,998,367
Patented Aug. 29, 1961

2,998,367
BOILING REACTORS
Samuel Untermyer 2nd, Atherton, Calif., assignor to General Electric Company, a corporation of New York
Filed Feb. 16, 1956, Ser. No. 565,884
9 Claims. (Cl. 204—193.2)

This invention relates to boiling reactors. While the practice of this invention is subject to a wide variety of modifications and variations, it is suited for use with boiling water-type reactors for supplying power to turbine systems and is particularly described in this connection.

A reactor generally includes nuclear fuel, a coolant, and a moderator substance. The coolant may or may not also act as the moderator. For example, the coolant may be light water which operates as a moderator and absorbs some neutrons; or the reactor may consist of a nuclear fuel, light water coolant, and a moderator of graphite, beryllium, heavy water or other moderator material. Control rods or other control means are generally provided to adjust the reactivity of the reactor, and hence to regulate the fission rate within the reactor.

A boiling reactor is a reactor in which at least a portion of the coolant is converted into vapor within the reactor. The heat energy in the coolant is utilized either indirectly through a heat exchanger or directly to provide vapor for the prime mover. For example, the coolant may consist of light water which provides steam to drive a steam turbine. A more complete discussion of boiling reactors and the theory of operation thereof appears in my article in Nucleonics, volume 12, No. 7, July 1954, pages 43–47.

Before proceeding with a detailed description of this invention, the following terms which are used throughout the specification are defined, in order to assure a complete understanding of this invention.

The reproduction factor of a nuclear reactor is the ratio of the number of neutrons created in the reactor in one fission generation to the number of neutrons which are created in the preceding fission generation. This ratio must be at least one in order to have a self-sustaining nuclear reaction. If the reproduction factor is less than one, then the chain reaction tends to die out, while if it is greater than one the reaction increases.

Reactivity can be defined as the amount by which the reproduction factor of a reactor differs from one divided by the reproduction factor of the reactor. Positive reactivity denotes that the reproduction factor of the reactor is greater than one, while negative reactivity denotes a reproduction factor less than one.

Conversion occurs when a fertile material such as uranium 238 or thorium 232 captures neutrons and is converted to plutonium or uranium 233, respectively. Plutonium and uranium 233 are fissionable materials. Breeding occurs when more fissionable material is produced from fertile material than is consumed in operation of the reactor. The breeding or conversion ratio is a function of the average number of neutrons available for conversion. Accordingly, as neutron losses are reduced, the breeding or conversion ratio tends to be improved.

A volatile moderating neutron absorbing coolant is a coolant which can be changed in state by the addition of energy and which also has the ability to moderate or slow down neutrons and to absorb a portion of the low energy neutrons. For example, light water can be vaporized by the addition of heat and is thereby changed in state. Water also has a moderating influence on neutrons and water absorbs some of the thermal energy neutrons.

A region of a reactor which includes vapor state coolant is a boiling region, while a region containing substantially no vapor state coolant is a non-boiling region.

Reactors can be classified generally as self-regulating, or as auto-catalytic. The self-regulating type reactor is one in which an increase in reactor power results in a decrease in reactivity, which in turn reduces the reactor power. This type of reactor is said to fail safe. That is, if the power of the reactor exceeds safe limits, the reactor will tend to shut down rather than "run away." An auto-catalytic type reactor is one in which an increase in reactor power causes an increase in reactivity, resulting in a further increase in reactor power. If the power of this type of reactor is increased, the reactivity of the reactor tends to increase so that the reactor tends to "run away" and destroy itself unless otherwise limited.

Void coefficient or reactivity can be defined as the change in reactivity divided by the change in voids; i.e., voids resulting from vaporized coolant, for example, steam voids. In the limit, the void coefficient of reactivity is the ratio of the change in reactivity to the change in voids for an infinitesimally small change in voids or void fraction. Void fraction may be defined as the volume ratio of voids to total volume of coolant in the reactor core, e.g. fraction of volume in the reactor core occupied by steam. If the reactivity increases as the void fraction increases, then the void coefficient is said to be positive. If the reactivity decreases with increased voids, the void coefficient of reactivity is negative.

The over-all void coefficient of reactivity is the void coefficient of the entire reactor considered as a unit as distinct from the local void coefficient of reactivity in discrete regions of the reactor. The over-all void coefficient of reactivity may be determined by introducing a small quantity of voids uniformly distributed throughout the reactor. Then the over-all void coefficient of reactivity will be the ratio of the change in reactivity divided by the fraction of voids introduced.

The void coefficient of reactivity of a discrete region is the local coefficient of reactivity which is the change in reactivity of the reactor due to the change in voids in the small region divided by a factor representing the nuclear importance of this small region as compared to the entire reactor.

The practice of this invention is generally concerned with self-regulating boiling reactors using moderating and neutron absorbing coolants. A light water cooled reactor can be designed so that the boiling or vaporization of the water during operation decreases the reactivity as the coolant is expelled from the reactor by the formation of steam. In a typical reactor the maximum decrease in reactivity that can be tolerated within the operating range of the reactor may be of the order of 3%, which may correspond in such a typical reactor to an over-all void fraction of 20%.

Since the power output of a boiling reactor is determined by the flow of steam or vapor state coolant through the reactor, it is desirable to operate such a reactor with a maximum possible void fraction without exceeding the tolerable decrease in reactivity.

If a reactor core having a uniform void coefficient of reactivity is designed to have a small negative void coefficient at room temperature so that the reactor fails safe, then the over-all void coefficient of reactivity at operating temperatures is so large as to restrict the operational steam content of the reactor, and thereby limit the power output. This is apparent, since at operating temperatures the coolant density decreases thereby decreasing the atomic ratio of moderating coolant to fuel. Therefore, when the water density is reduced at operating temperature, the void coefficient of reactivity is greater and fewer steam voids reduce the reactivity to the point where stable operation cannot be maintained.

If the reactor core is provided with a sufficiently high ratio of volatile moderating neutron absorbing coolant to fuel so as to provide optimum reactivity at the operating temperature, the core has a substantial positive void coefficient of reactivity at room temperature so that during start-up the reactor does not inherently fail safe. Thus, the reactor would be unsafe during the period while it was being brought up to operating temperature.

In accordance with an aspect of this invention, improved performance, including enhanced power output over that obtainable from previously known boiling reactors, is obtained by providing a reactor core having a non-uniform void coefficient of reactivity. The reactor is inherently self-regulating under all conditions.

It is, therefore, an object of this invention to provide improved boiling reactors.

A further object of this invention is to provide improved boiling reactor power systems.

Another object of this invention is to provide improved self-regulating boiling reactors wherein the amount of vaporized coolant available for power generation is enhanced.

It is also an object of this invention to provide improved nuclear reactors having an enhanced over-all breeding ratio.

According to an aspect of this invention, there is provided a boiling reactor comprising a volatile moderating coolant and nuclear fuel defining at least one substantially non-boiling region and at least one boiling region. The boiling region has a more positive void coefficient of reactivity than the non-boiling region to reduce the effects of boiling on the over-all nuclear characteristics of the reactor and to increase the amount of vapor state coolant in the reactor available for power generation. The combined effects of the void coefficients of reactivity of the boiling and non-boiling regions are such that the over-all void coefficient of reactivity of the reactor is satisfactory under all conditions.

Other objects and important aspects of this invention will become apparent from the following portions of the specification and claims when taken with the figures of the drawing wherein:

FIGURES 1 and 2 are diagrammatic illustrations useful in explaining the principles of this invention;

FIGURES 3 through 6 illustrate embodiments of this invention, and

FIGURE 7 illustrates a complete electrical generating system incorporating this invention.

The theory of this invention is described by reference to FIGURES 1 and 2 of the drawing.

As has been pointed out, the void coefficient of reactivity increases with temperature so that if a uniform core is designed to have a small negative void coefficient of reactivity at room temperature or under start-up conditions, the void coefficient of reactivity at the operating temperature is large and restricts the operational steam content of the reactor.

The practice of this invention overcomes this limitation by utilizing a reactor core having a non-uniform void coefficient of reactivity. For purposes of this explanation, the reactor core volume may be considered to be divided into two regions as illustrated in FIGURE 1 which shows a portion of a reactor core. Coolant flows up through the paths defined by the fuel elements and is heated by the fuel elements. In the upper region, during normal operation, boiling occurs. In the lower region, substantially no boiling occurs.

Since boiling is generally confined to the upper region, the operating performance of the reactor is principally dependent upon the characteristics of this part of the reactor core. Therefore, in the practice of this invention, this upper or boiling region is designed to have a positive void coefficient of reactivity at start-up temperatures and high reactivity at operating temperatures. It is also provided with a large coolant flow area, as a result of eliminating some of the fuel in the boiling region, to facilitate thereby the extraction of vaporized coolant. The larger coolant flow area results from elimination of some of the fuel from this region.

The non-boiling regions have sufficiently negative void coefficients of reactivity with respect to the void coefficients of the boiling regions so that at all temperatures, start-up to operating, the over-all void coefficient of reactivity is satisfactory; i.e., it is always in the range from zero to negative so that the reactor will fail safe.

Thus, improved performance is obtained by arranging the boiling portion of the reactor core to optimize operating performance at the operating temperatures while at the same time inherent safety of the reactor is assured by constructing the non-boiling portion of the core with a large enough negative void coefficient of reactivity so that the effective over-all coefficient of reactivity of the reactor is always satisfactory both at operating temperature and at room or start-up temperature.

FIGURE 2 illustrates a plot of relative reactivity as a function of the ratio of volatile moderating coolant to nuclear fuel. An increase in coolant temperature and/or the formation of voids reduces the ratio of coolant to fuel. The regions of the illustrated curve which have a negative slope represent conditions obtaining in those portions of a reactor where expulsion of coolant tends to increase reactivity. That is, as the ratio of coolant to fuel is decreased, the reactivity tends to increase. The reactor is over-moderated and has a positive void coefficient of reactivity. Any expulsion of moderating coolant tends to increase reactivity and tends to cause a reactor to "run away" and possibly destroy itself.

The portions of the curve having a positive slope represent conditions obtaining in those regions of a reactor which are "under-moderated," wherein a decrease in the ratio of coolant to fuel results in decreased reactivity. These regions have a negative coefficient of reactivity. Expulsion of moderating coolant results in decreased reactivity. In the event of excessive boiling, the reactor will tend to shut down and "fail safe."

The reactor illustrated in FIGURE 1 may be designed in accordance with this invention to have a void coefficient of reactivity in the boiling region at start-up temperature which is positive and designated by the point $B_r$ on the curve. As the reactor core temperature increases to operating temperature, the reactivity of the boiling region of the core increases along the curve to point $B_o$.

Therefore, at operating temperatures, the reactivity of the boiling region of the core is high. During boiling, the reactivity decreases due to the formation of steam voids, along the curve to point $B_b$ beyond which the loss of reactivity due to boiling is so great that instability results. The loss in reactivity due to steam voids is represented by the distance $R_o$. The projection of the distance $B_o$—$B_b$, along the curve, on the abscissa is indicative of the maximum permissible steam void fraction or amount of vapor state coolant in the reactor available for power generation.

In order to counteract the positive void coefficient of reactivity of the boiling region during start-up, the remainder of the core or non-boiling region has a negative void coefficient of reactivity designated by point $NB_r$ chosen so that the over-all void coefficient of reactivity of the reactor at start-up is satisfactory. An increase in voids, owing to a power surge which might result from inadvertent withdrawal of control rods, results in reduced reactivity; therefore, the reactor fails safe under all conditions.

In boiling reactors, having a uniform void coefficient of reactivity, the void coefficient of reactivity must be zero or slightly negative at room temperatures so that the reactor fails safe under all operating conditions. As the reactor temperautre rises, the atomic ratio of water to fuel decreases and the reactivity decreases before any boiling occurs.

Therefore, the characteristics of a reactor with a uniform void coefficient of reactivity might, at start-up temperature, be designated by the point $U_r$ on the curve and at the operating temperature by the point $U_o$. The operating point beyond which instability results is denoted by $U_b$ corresponding to a loss in reactivity due to boiling $R_b$, where $R_o$ equals $R_b$. The permissible percentage of vapor voids available for power generation is represented by the projection of the distance $U_o$—$U_b$, along the curve, on the abscissa. This is less than the projection of $B_o$—$B_b$ available for the same over-all loss of reactivity with the non-uniform core.

In each case shown on FIGURE 2, vapor formation is obtainable over the same range of loss of reactivity controlled by steam voids, but the permissible steam voids and hence the power output is greater in the reactor incorporating the practice of this invention. That is, for a given loss of reactivity in the reactor of this invention, the number of vapor voids is greater; i.e., the permissible void fraction is greater and, therefore, the power output is enhanced, yet the reactor always fails safe, since the over-all void coefficient of reactivity is always satisfactory.

Therefore, for the same amount of reactivity controlled by steam voids, the power available from a reactor constructed in accordance with this invention is higher than that obtainable with a reactor having a uniform void coefficient of reactivity.

The void coefficient of reactivity characteristics of a two region (boiling and non-boiling) reactor in accordance with this invention may be summarized by the following tabulation.

| | Room Temperature | Operating Temperature | Operating Temperature Boiling |
|---|---|---|---|
| Over-all Void Coefficient of Reactivity. | Satisfactory Negligible. | Negative. | Strong Negative. |
| Boiling Region Local Void Coefficient of Reactivity. | Positive. | About Zero. | Negative. |
| Non-Boiling Region Local Void Coefficient of Reactivity. | Negative. | Very Negative. | Extremely Negative. |

In the above description, it has been assumed that a light water moderator has been used. It is readily apparent that reactors in accordance with this invention may use many different moderators or combinations of moderators. For example, a combination of light water and graphite or light water and other hydrogenous moderator may be utilized in the practice of this invention. The reactor core may have two regions, boiling and non-boiling, or a plurality of regions having different void coefficients of reactivity since boiling occurs to some extent in more than one discrete region. The void coefficients of reactivity may vary uniformly or non-uniformly along coolant channels or throughout the core as dictated by the particular reactor design requirements. In the practice of this invention, the void coefficient of reactivity may vary along one, two or three dimensions of the reactor core to obtain optimized power output.

The fuel may take the form of rods, plates or particles containing such fissionable materials as uranium-235, uranium-233, or plutonium in metallic or compound form. This fuel may incorporate such fertile materials as uranium-238, or thorium-232 in metallic or compound form. Materials such as zirconium, aluminum, stainless steel, or other satisfactory structural materials may be used as fuel diluents and cladding.

It will be apparent that the practice of this invention may result in the generation of substantial amounts of fissionable material as a result of reactor operation.

The reactor fuel may also be in the form of a homogeneous slurry with the necessary solid moderator dispersed therein so as to obtain an effective non-uniform void coefficient of reactivity throughout the homogeneous mass.

The volatile moderating coolant may be force circulated through the core or circulation may be effected by natural circulating forces and the coolant channels may be vertical or horizontal as dictated by the design criteria for a particular reactor or reactor powered system. The practice of this invention may be carried out with dual cycle reactors of the type disclosed in my patent application Serial No. 497,063, filed March 28, 1955, now abandoned, and assigned to the same assignee as this application, to provide the improved system described by way of example in connection with FIGURE 7 of this application.

FIGURE 3 illustrates a specific embodiment of a reactor incorporating the practice of this invention. Only a portion of the reactor core and enclosure are illustrated in this figure and FIGURES 4, 5, and 6 in order to simplify the description of this invention. It will be appreciated by those skilled in the art that core supports, circulating pumps, shielding, coolant purification apparatus, controls, and instrumentation are necessary in a complete reactor system.

The reactor core includes a plurality of uranium dioxide rods clad with a suitable material such as zirconium. The rods are slightly enriched with uranium-235 and are arranged to provide a non-uniform concentration of nuclear fuel along the coolant paths defined by the rods and so that the ratio of liquid moderator to fuel is low in the lower regions and high in the upper regions. Light water is utilized as a moderator and coolant and three regions having different void coefficients of reactivity are provided along the coolant paths defined by the rods.

The core includes short fuel rods 10, rods 11 of intermediate length, and rods 12 extending the full height of the core, immersed in light water 13. The reactor core is enclosed by reactor vessel 14, which is provided with a steam head 15, steam outlet 16, and coolant entrance 17. Details of the coolant passages are not shown in the interests of simplicity.

FIGURES 3a, 3b, and 3c show successive sections a—a, b—b, and c—c through a portion of the reactor. Coolant from a turbine condenser or make-up feed supply enters at 17, flows, as indicated by the arrows, up through the paths or channels defined by the rods and returns by passages (not shown). Substantial boiling occurs in region 18, and steam is extracted from steam drum 15 through outlet 16.

During operation, water is heated in the lower approximate one-third of the core while boiling occurs in the upper two-thirds of the core. At room temperature, the highest reproduction factor for this reactor corresponds to a core composition containing approximately one volume of high density slightly enriched uranium dioxide and about two volumes of water. At the operating temperature, the highest reproduction factor is obtained with approximately one volume of fuel and three volumes of water. The structural and cladding materials occupy about one additional volume.

If the entire reactor were designed to have a water-fuel volume ratio of three, it would not be possible to start this reactor safely at room temperature, since under these conditions, the optimum reproduction factor at room temperature would be obtained with a water-fuel ratio of two so that a reactor having a water-fuel ratio of three would initially gain reactivity upon formation of steam and, therefore, be unstable.

Therefore, only the upper portion of the reactor core, wherein substantial boiling occurs during operation, is constructed with a water-fuel ratio of three. The remaining portions of the core have lower water to fuel ratios, the bottom region being approximately 1.5. Thus, the sudden formation of steam during start-up shuts off the reactor, and the reactor fails safe. Since the portion of the reactor, in which boiling occurs during operation, is constructed with a water-fuel ratio of three, the operating steam void coefficient is as small as possible.

The use of a low water to fuel ratio in the non-boiling portion, which produces a large portion of the power output, results in improving the conversion or breeding ratio of the entire reactor. This also results in improved heat transfer characteristics under transient conditions and a safer reactor.

In addition, the amount of coolant within the upper part of the reactor is large, approximately 60 percent of the boiling region of the core is filled with coolant, so that ample room is available for steam to flow out of the reactor. This permits a higher rate of steam production.

FIGURE 4 illustrates an alternative embodiment of this invention. Plates of highly enriched uranium alloy of aluminum or zirconium, appropriately clad with aluminum or zirconium, are arranged so that in the non-boiling portion, the ratio of moderating coolant to fuel is low and in the boiling regions, the ratio of moderating coolant to fuel is high. The reactor core includes a plurality of long plates 19 and successively shorter plates 20 and 21, which are arranged to provide a plurality of regions having different concentrations of nuclear fuel resulting in different void coefficients of reactivity along the coolant channels defined therebetween. The entire structure is enclosed in tank 22 having coolant inlet 23 and vaporized coolant outlet 24 and providing a steam head 25. Volatile moderating neutron absorbing coolant 26 covers the plates. The fuel plates have a large surface to volume ratio so that the heat transfer to the coolant is enhanced.

In a typical system, coolant, for example, from a condenser or make-up feed supply enters inlet 23, flows, as indicated by the arrows, through the channels defined by the plates. A portion of the coolant is vaporized and collects in steam head 25 and the remainder of the coolant is recirculated (through passages not shown) and again passes between the fuel plates. Power is extracted from the vaporized coolant taken through outlet 24, the coolant is condensed, and returned to the reactor.

FIGURES 5 and 6 illustrate other embodiments of this invention wherein like members are designated by the same reference numbers and wherein a combination of volatile moderating coolant and solid moderator is utilized. In FIGURE 5, fuel rods or slugs 27 and graphite moderator 28 define coolant channels 29. The moderator and fuel are shaped and arranged to provide along the coolant channels 29, a plurality of regions of varying void coefficients of reactivity. In FIGURE 5, the graphite blocks are tapered so that the concentration of moderator varies along the coolant channels. Alternatively, fuel slugs of different cross section can be utilized to effect a plurality of regions having different void coefficients of reactivity. This is illustrated in FIGURE 6.

Volatile coolant 30 is introduced through inlet 31 of reactor enclosure 32, flows, as illustrated by the arrows, up through channels 29, and is returned by passages 29a. Vaporized coolant flows through outlet 33, and energy is extracted therefrom.

Alternatively, the fuel may be in the form of conventional shaped particles, for example, as disclosed on page 1040 of the Chemical Engineers Handbook, McGraw-Hill, 1934, arranged in a bed so that the density or concentration of fuel is greatest at the bottom of the bed and lowest at the top of the bed. This may be accomplished by varying the shape, size distribution, or fuel concentration in successive layers of particles. The particles define coolant passages therebetween and the bed is covered with coolant.

Thus, the ratio of volatile moderating neutron absorbing coolant to fuel is high in the boiling region; i.e., in the upper portion of the pile and relatively low in the lower, non-boiling, regions of the pile.

FIGURE 7 illustrates the practice of this invention in a dual cycle boiling reactor system off the type disclosed in my aforementioned patent applications. It will be readily apparent in the consideration of this figure of the drawing and the following description, that a non-uniform volatile moderating coolant to fuel ratio can be obtained in a reactor having coolant channels of substantially uniform physical dimensions. This may be achieved by varying the concentration of nuclear fuel in fuel elements to obtain the desired variation of void coefficient of reactivity along the coolant channel. Alternatively, a core including a plurality of fuel rods or plates such as disclosed in connection with the description of FIGURES 3 and 4 can be utilized in the system illustrated in FIGURE 7.

Reactor vessel 34 encloses reactor core 35 and a steam dome or region 36 above the surface of coolant 37. The reactor proper is composed of a plurality of nuclear fuel members 38, in this example in the form of plates, with coolant channels 39, therebetween. The reactivity of the reactor core 35, is controlled by a plurality of control rods 40, which can be moved in and out of a portion of the channel as indicated by arrows 41, in order to obtain the desired rate of fission. Steam from steam dome 36 is carried by pipe 42 to steam drum 43, where the water is removed and the water returned by drain 44 to the base of reactor vessel 34.

Steam from the beam drum is carried by pipe 45 to the input of high pressure turbine 46 of multistage turbo-generator 47. Turbo-generator 47 consists of a high pressure multistage turbine 46 and a low pressure multistage turbine 48 connected on a common shaft to drive generator 49 from which electrical energy can be obtained from output terminals 50. Exhaust steam from high pressure stage 46 is carried by pipe 51 to multistage low pressure turbine section 48. The exhaust steam from turbine 48 is condensed in condenser 52, and carried by pipe 53 to circulating pump 54. From pump 54, water flows through pipe 55 to pump 56 and in a subcooled state is introduced into reactor vessel 34 through pipe 57. This is the steam phase or cycle of this reactor system. The utilization of a reactor core having a non-uniform void coefficient of reactivity throughout results in a higher permissible percentage of steam voids; i.e., a higher steam void fraction for a given over-all reactivity, than would be obtainable with a core with a uniform void coefficient of reactivity. Therefore, the available power is enhanced.

In the water phase or cycle of this reactor system, high temperature, non-boiling water is extracted from vessel 34 by pipe 58 and flows to heat utilizing apparatus 59. This heat utilizing apparatus, for example, can be a heat exchanger which is used to heat water to form steam for the low pressure stages of the turbine, or, as in this specific embodiment, the heat utilizing apparatus 59 can consist of a "flash" chamber. A pressure reduction nozzle 60 sprays high temperature water into chamber 59 which is maintained at reduced pressure so that a portion of the hot water immediately flashes into steam which is carried through pipe 61 to low pressure turbine 48. The portion of the non-boiling coolant or water which is not flashed into steam in flash chamber 59 is returned through pipe 62 to pump 56 which discharges this water along with the water from condenser 52 to reactor vessel 34.

The system described in connection with the illustration in FIGURE 7 may then be considered a dual cycle boiling reactor system incorporating the non-uniform void coefficient of reactivity core of this invention. There being a steam or vaporized coolant cycle and a liquid or non-boiling coolant cycle, both of which supply energy from the reactor to the turbo-generator.

It should be noted that appropriate radiation shielding is provided around reactor vessel 34 and around other equipment and piping as necessary and that illustration of such shielding has been eliminated from the illustration in FIGURE 7 to simplify the description of this invention. For the same reason, a number of additional elements necessary for a complete operating system have been eliminated from the showing. These, for example, would include purifiers to provide and maintain pure coolant for the reactor, steam separators, feed water heaters, pressure regulating apparatus, a condenser cooling system, and all necessary instruments and controls.

The volatile moderating coolant is heated by flowing through channels 39, as is illustrated by the arrows. It is noted that horizontal reactor channels may be utilized. However, in the interest of simplicity in the description only vertical channels have been illustrated throughout. As the coolant rises through channel 39, it absorbs increasing amounts of heat which causes a plurality of vapor bubbles or voids to form in the liquid and to rise up through the channels.

As has been previously discussed, the percentage or concentration of these vapor bubbles, or steam voids in the case of a boiling water reactor, determines the reactivity of the reactor. In accordance with the practice of the invention disclosed in my aforementioned patent applications, steam is formed closer to the outlet ends or upper ends of channels 39 so that the power output of the reactor is enhanced. This is accomplished by introducing subcooled coolant to the base of the reactor and effectively extracting a portion of the heat from the mid-portion of the reactor core to substantially limit boiling to an end region only of the core. The addition of the practice of this invention to the system results in further enhanced power generation in the upper portion of the core as a result of varying the ratio of moderating coolant to nuclear fuel along the reactor coolant channels so that the number of permissible steam voids in this end region is increased without exceeding the limits of nuclear stability.

Therefore, in the practice of the dual cycle principle disclosed in my aforementioned patent applications, for the same over-all reactivity, it is possible to obtain more power for a given number of steam voids. In the practice of this invention, more voids are obtainable without exceeding the limits of nuclear stability in the reactor and, therefore, more power is obtained. A system incorporating both of these inventions results in an improved reactor system which is inherently safe and from which large amounts of power can be extracted.

The coolant is in the examples herein described light water, but without departing from the spirit of this invention may consist of other coolants such as for example moderating materials having a relatively high latent heat of vaporization and which absorb neutrons. Water is particularly desirable for utilization in commercial power applications of this invention because of its relatively short half life (in the order of seconds) which renders the likelihood of contamination of piping and turbine equipment relatively slight thereby minimizing the hazards to operating personnel.

Whereas the void coefficient of reactivity of heavy water cooled and moderated reactors can be made satisfactory with a uniform fuel loading; the practice of this invention allows the use of higher fuel concentrations in the non-boiling regions, and, thereby improves the conversion or breeding ratio and raises the over-all (negative) reactor void coefficient of reactivity without prejudice to the local void coefficient of reactivity of the boiling region. Thus, heavy water boiling reactors, in accordance with this invention, have an improved breeding ratio and are inherently safer.

In the practice of this invention, the operating void coefficient of reactivity is maintained at a low level. In addition, the higher coolant to fuel ratio at the coolant exit allows steam or vaporized coolant to escape more easily. The reactor is inherently safe under all conditions because the effective over-all void coefficient of reactivity is always satisfactory.

In addition, the breeding or conversion ratio of the reactor core is improved since the non-boiling portion or region of the reactor, where a substantial proportion of the power is produced, has a low coolant to nuclear fuel ratio and, therefore, a high conversion ratio.

In view of the preceding description, it is apparent that this invention overcomes limitations of previously known reactors by providing a reactor which is inherently safe under all conditions while at the same time providing substantially optimized operating characteristics in the region of the reactor core where vapor formation occurs. Thus, a high performance inherently safe reactor is provided by this invention.

The specific embodiments, described herein, are presented merely as examples of the many forms the practice of this invention may take. Therefore, it is intended in the appended claims to cover all modifications and variations which come within the true spirit and scope of this invention.

What I claim as new and desire to secure by Letters Patents of the United States is:

1. A boiling reactor which comprises a volatile neutron-moderating coolant and a nuclear fuel assembly capable of sustaining a chain fission reaction and having a plurality of regions having different void coefficients of reactivity, said assembly having, in the absence of vaporized moderating coolant, a moderator to fuel atom ratio which increases substantially throughout said assembly in the direction of coolant flow therethrough, the regions in which boiling occurs having positive void coefficients of reactivity at least at start-up temperatures to increase the amount of vapor state coolant in the reactor available for power generation, and the regions in which no boiling occurs having negative void coefficients of reactivity, said reactor having a satisfactory over-all void coefficient of reactivity under all conditions, said moderating coolant comprising water.

2. A boiling reactor which comprises a volatile neutron-moderating coolant and nuclear fuel assembly capable of sustaining a chain fission reaction and having at least one coolant path which includes boiling and non-boiling regions, the atom ratio of moderator to nuclear fuel, in the absence of vaporized moderating coolant, increasing substantially throughout said assembly with distance along said coolant path in the flow direction to define a plurality of regions having different void coefficients of reactivity varying from negative in the non-boiling regions to positive under start-up conditions in boiling regions so that the permissable amount of vapor state coolant in the reactor which is available for power generation is increased, said moderating coolant comprising water, said reactor having a satisfactory over-all void coefficient of reactivity under all conditions.

3. An apparatus according to claim 2 wherein said nuclear fuel elements are of different lengths disposed essentially parallel to one another and extending from the coolant inlet end of the nuclear assembly along the coolant paths to various different points in the assembly.

4. An apparatus according to claim 2 wherein the nuclear assembly contains fuel elements of essentially equal length disposed essentially parallel to one another, said fuel elements having a decreasing cross sectional area in the direction of coolant flow.

5. The boiling reactor according to claim 2 wherein the nuclear fuel is included in fuel plates defining therebetween a plurality of coolant paths.

6. The boiling reactor according to claim 2 wherein said nuclear fuel is included in fuel rods defining therebetween a plurality of coolant paths.

7. A boiling reactor system which comprises a volatile neutron-moderating coolant and a nuclear fuel assembly capable of sustaining a chain fission reaction and having at least one coolant path which includes boiling and non-boiling regions, the atom ratio of moderator to nuclear fuel, in absence of vaporized moderating coolant, increasing substantially throughout said assembly along said path in the flow direction to define a plurality of regions having different void coefficients of reactivity varying from negative in the non-boiling regions to positive under start-up conditions in the boiling regions so that the permissable amount of vapor state coolant in the reactor available for power generation is increased, said moderating coolant comprising water, said reactor having an over-all void coefficient of reactivity which is satisfactory for nuclear stability under all conditions, and means coupled to said reactor for extracting energy from said vapor state coolant.

8. The boiling reactor system according to claim 7 in combination with means for extracting energy from a non-boiling portion of the coolant, and means for introducing sub-cooled coolant to the reactor to reduce the portion of the coolant within the reactor which includes vaporized coolant so that the power output of the system is enhanced and the system is substantially self-regulating.

9. In a boiling water reactor which comprises a nuclear fuel element array containing at least slightly enriched uranium dioxide and having a plurality of coolant flow paths extending therethrough, light water as a volatile neutron-moderating coolant within said paths cooperating with said fuel element array to provide a nuclear chain-reacting assembly to liberate heat and at least partly vaporize said water, means for supplying water to one end of said assembly, and means for removing a mixture of steam and water discharged from the other end of said assembly, the improvement which comprises said nuclear chain-reacting assembly in which, in the absence of steam, the volumetric ratio of liquid water to uranium dioxide increases substantially throughout said assembly with distance in the flow direction from a value of approximately 1.5 in the region adjacent the water inlet end to a value of about 3 in the region adjacent the steam and water outlet end of said assembly, the remaining intermediate portions of said assembly having ratios between approximately 1.5 and 3.

References Cited in the file of this patent

UNITED STATES PATENTS 2,810,689     Wigner et al. ---------- Oct. 22, 1957

OTHER REFERENCES

U.S. Atomic Energy Commission, A.E.C.D.–3715, Feb. 1, 1954, page 11 (by Lupe). Copy available in Scientific Lib.

Proceedings of the International Conference on the Peaceful Uses of Atomic Energy, vol. 3 (Power Reactors). Held in Geneva 8 August–20 August, 1955. United Nations N.Y. 1955. Pp. 56–58 (article by Dietrich et al.); page 250–262 (article by Harrer et al.).

U.S. Atomic Energy Commision, A.E.C.D.–3840, February 1954, by Dietrich et al. Pp. 69, 70, 14, 15, 16, 11, 44, 45, 46, 47.